H. M. DU BOIS.
RIM BREAKER.
APPLICATION FILED MAR. 1, 1916.
1,199,674.
Patented Sept. 26, 1916.
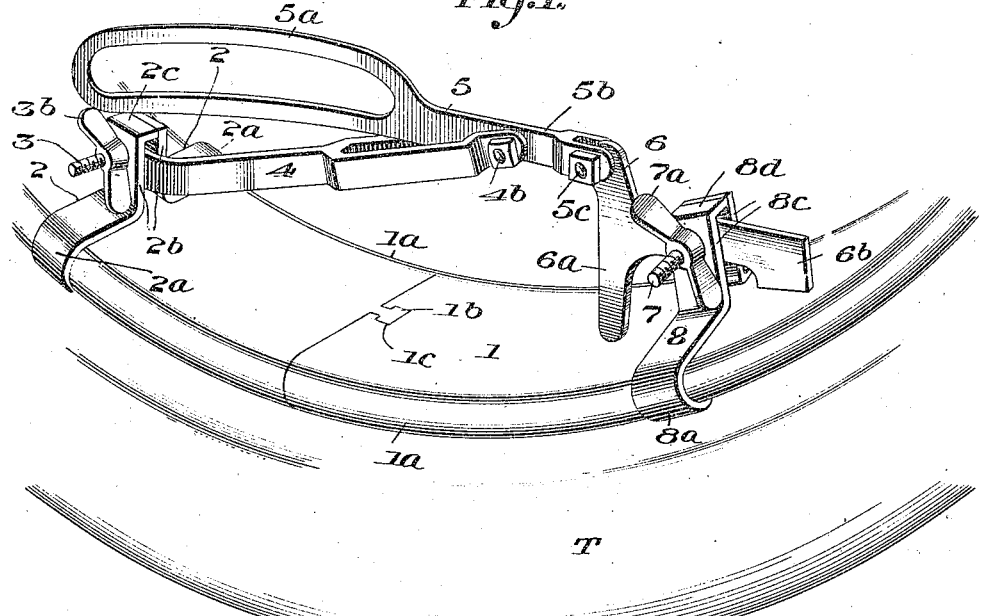
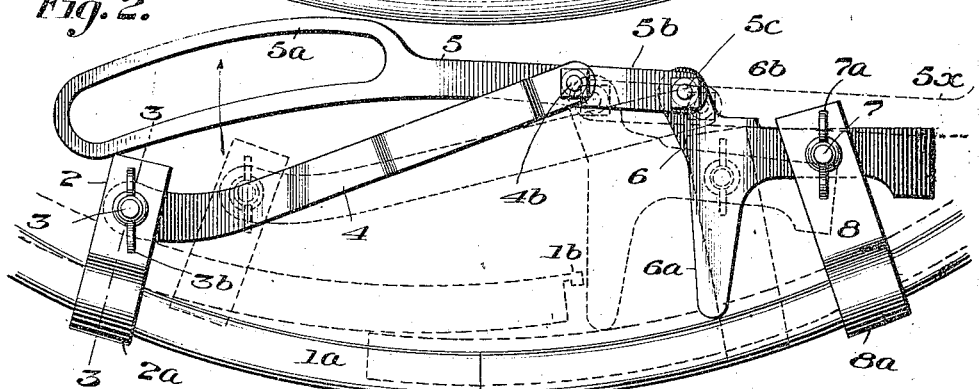
Inventor
Homer M. DuBois

UNITED STATES PATENT OFFICE.

HOMER M. DU BOIS, OF HOUSTON, TEXAS, ASSIGNOR OF ONE-HALF TO NEUVILLE W. DU BOIS, OF HOUSTON, TEXAS.

RIM-BREAKER.

1,199,674.     Specification of Letters Patent.     Patented Sept. 26, 1916.

Application filed March 1, 1916. Serial No. 81,351.

*To all whom it may concern:*

Be it known that I, HOMER M. DU BOIS, a citizen of the United States, residing at Houston, in the county of Harris and State of Texas, have invented certain new and useful Improvements in Rim-Breakers; and I hereby declare that the following is a full, clear, and exact description thereof, reference being had to the accompanying drawings, which form part of this specification.

This invention is a novel implement or tool for use in applying or repairing deflatable tires of automobiles or other vehicles using detachable wheel tires of that type in which resilient or cushion tires are applied to an annular metal rim, which is adapted to be detachably attached to the felly of a wheel; such rim being removable from the wheel when it is desired to repair the tire, and after the repairs have been made the tire is replaced upon the rim and secured thereto and the rim then replaced on the wheel.

The object of my invention is to provide a simple implement which can be readily carried in a tool kit of the machine, and by which an operator can very readily disengage the ends of the rim when it is desired to deflate a tire or reëngage the ends of the rim when it is desired to reconnect the same.

I will explain the invention with reference to the accompanying drawings.

In said drawings: Figure 1 is a perspective view of the implement as applied to an ordinary detachable wheel rim, and in position preparatory to disconnecting the ends of the rim and contracting same. Fig. 2 is a side elevation of the implement applied to a rim, and showing it in full lines in position when first applied to a rim, or after it has been used to expand and reconnect the ends of the rim: and showing in dotted lines the parts in the positions assumed after it has been used to disconnect the ends of the rim and contract it. Fig. 3 is a detail section on line 3—3, Fig. 2.

The rim 1 is usually made of metal and corresponds in internal diameter to the external diameter of the periphery of the felly of the wheel on which it is to be mounted. Said rim may be of any desired shape in cross section to suit the tire with which it is to be used; and is shown as of the ordinary type commonly used with clencher tires, the edges of the rim being curved as shown at $1^a$ to engage the flanges $t$ of the tire T.

The meeting ends of the rim 1 should abut as shown in Fig. 1, and are customarily provided with some suitable interlocking means, by which they can be locked together when the rim is expanded as indicated in Fig. 1. I have merely conventionally shown an ordinary T-shaped locking lug $1^b$ on one end of the rim adapted to engage a corresponding slot $1^c$ in the other end of the rim; this is merely one of various types of interlocking devices which may be or are commonly used on such rims, and as it forms no part of the present invention needs no particular description herein. All the aforesaid parts are common and well known and may be of any ordinary or preferred construction.

As shown in said drawings the implement comprises two clamps each composed of two opposite members. The members of clamp 2 are substantially alike and are provided with curved portions $2^a$ adapted to engage the sides of the rim 1, and with upstanding portions $2^b$ which approach each other near the center of the rim, and which portions $2^b$ are connected by a bolt $3^a$ preferably secured by a wing nut $3^b$.

The clamp members 2 are also connected to one end of a link or lever 4, which is strung on the bolt $3^a$ intermediate the members 2. One of the clamp members may be provided with a flange $2^c$ on its upper end which overlies lever 4 so that when the clamps are applied to the rim and the bolt tightened the clamps may be firmly bound together to the rim without binding lever 4, see Fig. 3.

The lever 4 is preferably provided with a bifurcated outer end and is pivotally connected at its outer end by a bolt $4^b$ to a handle lever 5, which has a major handle portion $5^a$ and a short portion $5^b$ which extends beyond the pivot $4^b$ and has its end preferably bifurcated and pivotally connected by means of a bolt $5^c$ to one arm 6 of a three-armed lever or plate having a depending arm $6^a$, opposite arm 6, and a rearwardly projecting arm $6^b$ extending about perpendicular to arms 6, $6^a$. The arm $6^b$ is pivoted on a bolt 7 which is supported by and between the opposite members 8 of a clamp similar to the clamp 2. Each member 8 has a curved outer end 8ª adapted to engage the side of the rim, and an upstanding inner portion 8ᶜ, which portions 8ᶜ are transfixed by the bolt 7 and pivotally connected thereby. One of the parts 8ᶜ has a flange 8ᵈ which prevents the members 8 binding the lever 6ᵇ when the bolt 7 is tightened by wing nut 7ª.

The implement is applied to a rim as indicated in Figs. 1 and 2 of the drawings; clamps 2 and 8 being attached to the rim, on opposite sides of but adjacent the joint thereof, while the implement is expanded, as shown in Figs. 1 and 2, with the handle lever 5 resting upon or lying adjacent the clamp 2. After the clamps are thus applied it will be seen that the arm 6ª rests upon the inner side of the rim. When thus applied the arm 6ª forms a brace for the clamp 8 and prevents its tilting toward the other clamp, and as the hand lever 5 is turned to the position shown in dotted lines in Fig. 2, considerable leverage or pressure is applied through the arm 6ª to the rim at a point between the clamp and the end of the rim. Arm 6ª prevents clamp 8 slipping and holds the pivot 5ᶜ practically stationary relative to the rim, thus concentrating the power applied by the hand lever for the purpose of contracting the rim. When the hand lever is thrown around to the position indicated at 5ˣ in Fig. 2 it automatically locks and holds the rim in contracted position. By forcibly moving the lever 5, in the direction of the arrow, to the position shown in dotted lines in Fig. 2, the meeting ends of the rim will be first separated so as to disengage the catch 1ᵇ and then, by swinging the lever 5 to the position indicated at 5ˣ in Fig. 2, the ends of the rim will be caused to overlap as indicated in dotted lines in Fig. 2. In such position of course the rim will be contracted and the tire T can be readily removed for repairs or replacement. The implement should be left attached to the rim until the tire has been replaced thereon, then by returning lever 5 from position 5ˣ to the position shown in full lines in Fig. 2 the rim will be expanded and the rim catch 1ᶜ reëngaged thus securely locking the rim in expanded position.

What I claim is:

1. An implement for connecting and disconnecting the ends of a wheel rim; comprising opposite clamps, a lever pivotally connected to one of the clamps and having a fulcrum bearing upon the rim between its clamp and the end of the rim, a link connected to the other clamp, and a hand lever pivotally connected to said first lever and said link, substantially as described.

2. An implement for connecting and disconnecting the ends of a detachable wheel rim; comprising a pair of clamping devices adapted to be engaged with the rim adjacent the meeting ends thereof; a lever pivotally connected with one clamping device and having an arm adapted to engage with the rim between the clamp and end of rim, a hand lever connected with the said lever; and a link pivotally connected with the hand lever at one end and at its other end with the other clamping device.

3. An implement for connecting and disconnecting the ends of a detachable wheel rim; comprising opposite clamps; each comprising two members and means for detachably clamping said members to the rim, a three armed lever pivotally connected to one of the clamps and having one arm adapted to bear upon the inner side of the rim between the clamp and end of rim, and its third arm pivoted to the clamp, a hand lever connected to the other arm of said lever; a link pivotally connected at one end to the hand lever adjacent its pivot to the first lever, having its other end pivotally connected to the other clamp; whereby said clamp members may be forcibly moved toward each other to contract the rim.

In testimony that I claim the foregoing as my own, I affix my signature.

HOMER M. Du BOIS.